Patented Jan. 26, 1943

2,309,248

UNITED STATES PATENT OFFICE 2,309,248

DERIVATIVES OF SULPHANILAMIDE AND PROCESS OF PREPARING SAME

Jonas Kamlet and Lazar Rosenthal, Brooklyn, N. Y.

No Drawing. Application May 4, 1937, Serial No. 140,687

4 Claims. (Cl. 260—397.7)

Our invention relates to the preparation of new and useful chemotherapeutic compounds and, more particular, to water-soluble derivatives of p-aminobenzene sulphonamide, and has for its purpose the preparation of colorless, water-soluble derivatives of p-aminobenzene sulphonamide suitable for peroral and parenteral administration to humans, which are non-toxic on prolonged and repeated administration, which are well tolerated by the patient, which are readily absorbable into the blood stream and which have a rapid and specific bactericidal activity against those organisms for which p-aminobenzene sulphonamide has a specific chemotoxicity in vivo.

In 1935, Domagk (Deutsch. Med. Wochsch.: 61, 250, 1935) described the remarkable protection afforded to mice infected with virulent strains of hemolytic streptococci by injections of azo dyes containing the sulphonamide group para to the azo linkage. However, Colebrook, Buttle, Camb, O'Meara and Kenny (Lancet, 2: 1319, 1323, Dec. 5, 1936) found that these dyes have no inhibiting or bacteriostatic activity on hemolytic streptococci in vitro. By reduction with magnesium powder in vacuo, or with formaldehyde sodium sulphoxylate (Long and Bliss, Journal of the American Medical Association, vol. 108, No. 1, pg. 33), these azo dyes acquired an inhibitory effect in vitro comparable to that of the compound p-aminobenzene sulphonamide. They concluded, therefore, as did Trefouel, Nitti and Bovet (Comptes Rendus Soc. Biol. 120, 756, 1935) that these azo sulphonamide dyes have no activity per se but are similarly reduced in vivo to the chemotherapeutically active principle, p-amino-benzene sulphonamide.

Numerous subsequent reports have confirmed this conclusion and at the present time, p-aminobenzene sulphonamide (sulphanilamide) is being widely used for peroral and parenteral administration to humans in cases of hemolytic streptococcus conditions such as erysipelas, septicemia, puerperal sepsis, osteomyelitis of streptococcic origin, peritonitis, scarlatina, streptococcus meningitis, Ludwig's angina, otitis media, etc. as well as in pneumonia, especially where the causative organism is pneumococcus type III.

The disadvantage of using p-aminobenzene sulphonamide, per se, for parenteral administration to humans lies primarily in its relative insolubility, i. e. 0.8% in water or physiological saline at 37° C. This makes necessary the injection of large amounts of fluid intramuscularly or subcutaneously, often with great discomfort to the patient. Thus, for a daily dosage of 4 grams of p-aminobenzenesulphonamide, as much as 500 cc. of the 0.8% solution must be injected. Due to the tendency of the latter to crystallize out from solution on standing, even at 37° C., this solution must be prepared fresh extempore and must be injected much more rapidly than is usually advisable.

Various attempts have been made to render the p-aminobenzene sulphonamide compound water-soluble. Thus, by diazotization and coupling with m-phenylene diamine, a derivative of sulphanilamide was first proposed as a solution to the problem. This derivative, however, as well as some related compounds, have been found to possess disadvantages and in certain cases to have deleterious side reactions resulting in agranulocytosis, sulphemoglobinemia, methemoglobinemia, cyanosis, etc.

We find that by reacting p-aminobenzene sulphonamide with a formaldehyde alkali metal sulphoxylate, in a suitable medium such as aqueous solution, water soluble compounds are obtained which are non-toxic on prolonged and repeated administration, which are well tolerated by the patient, which are readily absorbable into the blood stream when administered either perorally or parenterally and are chemotherapeutic specifics against those organisms for which p-aminobenzene sulphonamide has a specific chemotoxicity in vivo. The introduction of the alkali N-methylene sulphinate radical into a chemotherapeutic compound containing a ring-substituted amine in order to render it water-soluble is not a new procedure. Thus, Ehrlich, by the introduction of one and two N-methylene sulphinate radicals into the molecule of arsphenamine, synthesized neo- and sulpharsphenamine, respectively, which require only ¼ to ⅛ as much water for solution as does the equivalent amount of arsphenamine.

Compounds containing the formaldehyde sulphoxylate (N-methylene sulphinate) radical are well tolerated by humans even in huge doses. Thus Rosenthal (Public Health Reports, 48, 1543, 1933) reports the parenteral administration of 20–30 grams of formaldehyde sodium sulphoxylate in a single injection as an antidote in acute mercurial poisoning, with no ill effects. In vivo, this compound had a marked specificity against pneumococci and protected mice inoculated with virulent cultures of the same.

We believe that the presence of both the p-aminobenzene sulphonamide and the N-methylene sulphinate groups in a compound exerts a synergistic action and renders such compound more active than either of these groups separately.

When equimolecular proportions of p-aminobenzene sulphonamide and formaldehyde sodium sulphoxylate are reacted in aqueous solution, sodium-p-sulphamido-anilino-N-methylene sulphinate is formed, thus:

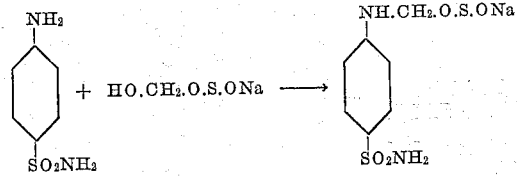

This salt precipitates from concentrated aqueous solution in the form of white, amorphous, granular particles, readily soluble in water and physiological saline. The 15.8% aqueous solution of the salt will keep indefinitely at 20° C. or above. On prolonged standing or refrigeration, a slight sediment may form which readily redissolves on warming the solution. The sodium salt is moderately soluble in alcohol but insoluble in ether, petroleum ether, chloroform, benzene and toluene. The 15.8% aqueous solution has a specific gravity of 1.079 and a pH of 5.0 at 22° C.

On acidification with a mineral acid, the sodium salt precipitatates the free p-sulphamido-aniline-N-methylene sulphinic acid as amorphous white granules, insoluble in water, soluble in alcohol, slightly soluble in ether, insoluble in petroleum ether, chloroform, benzene and toluene. It melts at 158°–160° C. with decomposition, and redissolves completely in alkali solutions in the cold.

The free acid will reduce ferric to ferrous salts, permanganates and manganates to $MnO_3$, cupric to cuprous salts and will vat or reduce warm solutions or suspensions of dyes, such as indigo, methylene blue and crystal violet, to their leuco bases. It will dissolve in aqua ammonia and caustic alkali solutions to form water soluble salts. With alkaline earth metals, such as calcium and barium and with metallic ions such as aluminum, arsenic, antimony, bismuth, zinc, lead, etc., it forms insoluble or slightly soluble amorphous white compounds.

On reacting one mole of p-aminobenzene sulphonamide with two or more moles of formaldehyde sodium sulphoxylate in aqueous solution, sodium-(p-sulphamido--N'-methylene sodium sulphinate)-anilino-N-methylene sulphinate is formed, thus:

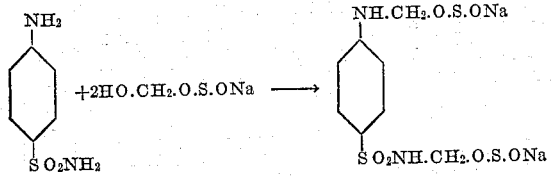

The salt precipitates from concentrated aqueous solutions in the form of white amorphous, granular particles, readily soluble in water and physiological saline. The 21.7% aqueous solution will keep indefinitely, even on prolonged standing or refrigeration, and has a specific gravity of 1.127 and a pH of 7.2 at 22° C.

The di-sodium salt is soluble in alcohol but insoluble in ether, petroleum ether, chloroform, benzene and toluene. On acidification with a mineral acid, it precipitates the free (p-sulphamido-N'-methylene sulphinic acid) anilino-N-methylene sulphinic acid as amorphous white granules, melting with decomposition at 170°–172° C. The solubilities of the free acid as well as its physical and chemical properties are similar to those of the free p-sulphamidoanilino N-methylene sulphinic acid.

This invention is not limited to compounds produced only by the direct interaction of p-aminobenzene sulphonamide and foraldehyde sodium sulphoxylate. Thus, sodium-p-sulphamido-anilino-N-methylene sulphinate may be syntheisized by dissolving one mole of p-aminobenzene sulphonamide in a solution of one mole of sodium formaldehyde bisulphite and reducing the resultant sodium-p-sulphamidoanilino-formaldehyde bisulphite with zinc dust in the cold, thus:

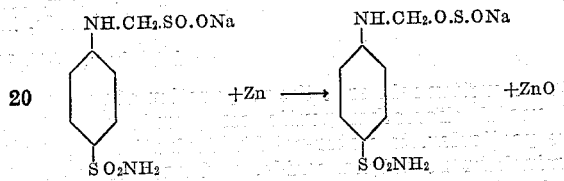

Similarly, sodium (p-sulphamido-N'-methylene sodium sulphinate) anilino-N-methylene sulphinate may be prepared by reducing one mole of sodium (p-sulphamido-N'-sodium formaldehyde bisulphite) anilino-N-formaldehyde bisulphite with two moles of zinc dust in the cold. In each case, the free acid may be obtained in a substantially pure form by acidifying the filtrate of the zinc oxide precipitate.

The tolerance of experimental animals to these compounds is high. Mice will tolerate as much as 3.5 to 5.0 grams of these compounds (calculated on the basis of their content of p-aminobenzene sulphonamide) per kilo of body weight in a single subcutaneous injection. Rabbits will tolerate 2.0 to 3.0 grams per kilo body weight in a single intravenous injection. The maximum tolerance of these compounds administered perorally is at least ten times as great.

The following example is intended to define and illustrate this invention but in no way to limit it to the reagents, proportions or conditions described therein. Obvious modifications will occur to any person skilled in the art.

*Example*

100.0 grams of pure p-aminobenzene sulphonamide and 100.0 grams of formaldehyde sodium sulphoxylate (analyzing 69% $HO.CH_2.SO_2Na$ and 31% water of crystallization and moisture) are added to 950.0 cc. of distilled water in a hard glass (pyrex) flask and heated to boiling with constant agitation. The solution is boiled gently for three to five minutes and rapidly filtered through an ashless filter paper. The water-clear solution is now dispensed without delay into sterile, neutral glass vials (or ampules) which are promptly sealed. After cooling spontaneously to room temperature and standing for 24 hours, the vials (or ampules) are placed in the boiling water bath for ten minutes and then allowed to cool.

The resultant water-clear, sterile 15.8% aqueous solution of sodium-p-sulphamido-anilino-N-methylene sulphinate is ready for peroral or parenteral administration. It is equivalent to a 10% solution of p-aminobenzene sulphonamide and contains 0.1 gram or 1.55 grains of p-aminobenzene sulphonamide per c. c. of solution.

If in the preceding example, 200.0 grams of formaldehyde sodium sulphoxylate were used, there would be obtained a 21.7% solution of sodium-(p-sulphamido - -N' - methylene sodium sulphinate) anilino-N-methylene sulphinate, equivalent to a 10% solution of p-aminobenzene sulphonamide.

Having described our invention, what we claim and desire to protect by Letters Patent is:

1. As a new product, sodium-(p-sulphamido-N'-methylene sodium sulphinate) anilino-N-methylene sulphinate.

2. A process for the preparation of an alkali-metal-(p-sulphamido-N'-methylene alkali-metal sulphinate) anilino-N-methylene sulphinate which comprises heating one mole of p-aminobenzene sulphonamide with at least two moles of formaldehyde alkali-metal sulphoxylate in aqueous solution.

3. As a new product, alkali-metal (p-sulphamido-N'-methylene alkali-metal sulphinate) anilino-N-methylene sulphinate.

4. As a new product, a member of a group consisting of (p-sulphamido-N'-methylene sulphinic acid) anilino-N-methylene sulphinic acid and salts thereof.

JONAS KAMLET.
LAZAR ROSENTHAL.